(12) United States Patent
Palazón Romero et al.

(10) Patent No.: US 9,860,248 B2
(45) Date of Patent: Jan. 2, 2018

(54) COMPUTER IMPLEMENTED METHOD, COMMUNICATIONS SYSTEM AND COMPUTER PROGRAMS PRODUCTS FOR SECURING OPERATIONS IN AUTHENTICATION AND AUTHORIZATION SYSTEMS USING BIOMETRIC INFORMATION

(71) Applicant: TELEFONICA DIGITAL ESPAÑA, S.L.U., Madrid (ES)

(72) Inventors: José Maria Palazón Romero, Madrid (ES); Antonio Guzmán Sacristán, Madrid (ES); David Barroso Berrueta, Madrid (ES); José María Alonso Cebrián, Madrid (ES); Daniel Kachakil Dib, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 91 days.

(21) Appl. No.: 14/392,140

(22) PCT Filed: Jun. 23, 2014

(86) PCT No.: PCT/EP2014/063189
§ 371 (c)(1),
(2) Date: Jan. 7, 2016

(87) PCT Pub. No.: WO2014/206946
PCT Pub. Date: Dec. 31, 2014

(65) Prior Publication Data
US 2016/0277395 A1    Sep. 22, 2016

(30) Foreign Application Priority Data

Jun. 24, 2013  (EP) .................................... 13382237
Oct. 9, 2013   (EP) .................................... 13382396

(Continued)

(51) Int. Cl.
*G06F 21/00*    (2013.01)
*H04L 29/06*    (2006.01)

(52) U.S. Cl.
CPC ...... *H04L 63/0861* (2013.01); *H04L 63/0428* (2013.01); *H04L 63/0838* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 2009/0183247 A1 | 7/2009 | Kasper et al. | |
| 2013/0036058 A1* | 2/2013 | Kelly ................... | G06Q 20/322 705/67 |
| 2013/0263211 A1* | 10/2013 | Neuman ................. | H04L 63/08 726/1 |

FOREIGN PATENT DOCUMENTS

WO    02/095554 A2    11/2002

OTHER PUBLICATIONS

International Search Report of PCT/EP2014/063189, dated Oct. 23, 2014. [PCT/ISA/210].

(Continued)

*Primary Examiner* — Brandon Hoffman
(74) *Attorney, Agent, or Firm* — Sughrue Mion, PLLC (57) ABSTRACT

The computer implemented method comprising controlling the access to different resources and actions defined for a user by a first server, reducing the exposure time at which such operations are available, establishing a dual channel verification through the use of a second server and reinforcing an authentication factor mechanism by including a biometric identity verification of biometric information of the user.

11 Claims, 5 Drawing Sheets

(30) Foreign Application Priority Data

Oct. 9, 2013 (EP) .................................... 13382397
Oct. 9, 2013 (EP) .................................... 13382398

(56) References Cited

OTHER PUBLICATIONS

Written Opinion of PCT/EP2014/063189, dated Oct. 23, 2014. [PCT/ISA/237].

* cited by examiner

COMPUTER IMPLEMENTED METHOD, COMMUNICATIONS SYSTEM AND COMPUTER PROGRAMS PRODUCTS FOR SECURING OPERATIONS IN AUTHENTICATION AND AUTHORIZATION SYSTEMS USING BIOMETRIC INFORMATION

CROSS REFERENCE TO RELATED APPLICATIONS

This application is a National Stage of International Application No. PCT/EP2014/063189 filed Jun. 23, 2014, claiming priority based on European Patent Application Nos. 13382237.9, filed Jun. 24, 2013; 13382396.3, filed Oct. 9, 2013; 13382397.1, filed Oct. 9, 2013 and 13382398.9, filed Oct. 9, 2013, the contents of all of which are incorporated herein by reference in their entirety.

FIELD OF THE ART

The present invention is directed, in general, to the field of biometric authentication methods and systems. In particular, the invention relates to a computer implemented method, a communications system and computer programs products for securing operations in authentication and authorization systems using biometric information.

BACKGROUND OF THE INVENTION

In recent years, web fraud detection market has increased considerably, so innovation in authentication and authorization processes has become of great importance.

The increasing complexity of applications has led to the adoption of many security techniques increasingly sophisticated. One of the classifications that can be proposed for the study of these security techniques allows distinguishing between authentication solutions and authorization solutions. The authentication techniques are designed to verify a person is the one who claims to be. In order to add more reliability in verifying that actually a person corresponds to the identity that is being checked, many alternative authentication schemes can be taken or the number of factors to build this authentication can be extended.

There are many solutions designed to strengthen the authentication processes and, by extension, to fortify the authorization processes. Once users have been securely identified, there are authorization schemes that allow flexibility and robustness in assigning permissions to users to ensure secure access to system resources. However, there are threats which cannot yet be thwarted by adopting any of the existing schemes for the authentication/authorization, or this adoption is too expensive to afford it. These threats directly affect the way the access to specific resources is performed. A method to address these threats involves the designing of brand new security mechanisms. These mechanisms must guarantee that once the identity of a user has been verified and the level of authorization to a resource for this user has been checked, the actions taken by the user of that resource are not intercepted and modified by any attacker.

In any authorization model different techniques that facilitate access to various system resources are included. The user role information, the access control data provided when the user is authenticated, are examples of information that can be used to determine whom to give access to what resources and how this access has to be guaranteed. Ultimately, determining what should be accessed by the users, will be specified for each application. For this reason, sometimes it will be difficult to provide a general authorization scheme. It will be necessary to define an application-specific logic to determine what users can access and how they would perform these accesses. From this idea, there are many solutions that propose secure and flexible schemes for the implementation of the authorization. In all these solutions, the security must be guaranteed by the correct selection of the authentication mechanism and a correct implementation of the selected authorization scheme.

Some of the solutions provide flexibility by defining their own SDK to encourage the use of their schemes for authentication/authorization. Today, most of the SDK are based on concepts introduced by OAuth and do not suppose a risk by themselves. This applies to Microsoft Live Connect, Facebook PHP SDK and Windows 8 SDK Authentication Broker. If they exist, the threats should come from a deficient use of these SDK. In fact, regardless of threats derived by a poor implementation of the scheme chosen, most of the threats that can be defined on an authorization system coincide with the threats defined for authentication systems. This coincidence has to do with the misuse of the credentials used to manage permissions granting access to resources [2], [5].

In [2] four different levels are defined in terms of the consequences of authentication and authorization errors and misuse of credentials. Level 1 is the lowest level (the most insecure) and level 4 is the highest.

Level 1—An attacker can perform repeated logon trials by guessing possible values of the token authenticator. An attacker is also able to replay previously captured messages (between a legitimate user and a verifier) to authenticate as that user to the verifier. NIST recommends the usage of a single or multi-factor authentication with no identity proof in order to provide protection against these online guessing and replay attacks.

Level 2—An attacker can listen passively to the authentication protocol to capture information which can be used in a subsequent active attack to masquerade as the user. NIST recommends the usage of single or multi-factor authentication to provide protection against these eavesdropping attacks and all the attacks from the level 1.

Level 3—The attacker positions himself or herself in between the user and verifier so that he or she can intercept and alter the content of the authentication protocol messages. The attacker typically impersonates the verifier to the user and simultaneously impersonates the user to the verifier. Conducting an active exchange with both parties simultaneously may allow the attacker to use authentication messages sent by one legitimate party to successfully authenticate to the other. NIST recommends the usage of a multi-factor authentication and wide use of OTP. It also suggests a token used for authentication to be unlocked by the user using a password or biometrics. Adopting these solutions provides protection against verifier impersonation attacks, MitM attacks and the attacks from level 2.

Level 4—An attacker is able to insert himself or herself between a user and a verifier subsequent to a successful authentication exchange between the latter two parties. The attacker is able to pose as a user to the verifier, or vice versa, to control session data exchange. On the other hand, the attacker may compromise or otherwise exploit authentication tokens and may intercept all input or output communications from the device (Man-in-the-device (MitD) attacks or Man-in-the-Browser (MitB) attacks). The attacker can do this infecting the system with malware. NIST suggests the usage of Multi-factor authentication with FIPS-140-2 certified tamper-resistant hardware (hardware tokens) [4] to get protection against these session hijacking attacks and the attacks from the level 3.

For the first three levels, attacks and existing solutions are both focused on the way of verifying the user's identity. At level 4, NIST proposes the use of solutions against session hijacking and others attacks over authentication processes. This session hijacking involves an attacker takes advantage of the legitimate exchange of credentials that a user makes to comply with the authentication process. Once this validation is accomplished, the attacker then intervenes in the communication that takes place. This type of attack can be implemented in two ways: actively acting, hijacking the connection and leaving out of it to the legitimate user, or, remaining hidden and modifying the content of communication transparently to the user. Whatever the implementation of this attack, it is important to observe that this is an attack aimed at breaking the authorization system, leaving intact, though useless, the authentication system. Although there are alternatives to proactively protect systems from this threat, there is no adequate solution to mitigate the effects of the attack once the device from which the resource access is requested, is committed.

NIST suggests employing FIPS-140-2 certified tamper-resistant hardware (hardware tokens) [4]. Using these devices provides the users the ability to generate a single use password (one time password, OTP) to prove their identity to each transaction. In addition, there are hardware implementations of these tokens that can generate other OTPs coded to contain information on how to complete a specific transaction.

Different criteria can be defined to establish comparison between authentication/authorization schemes. In [1] the authors suggest the need to define three criteria in order to perform an effective comparison. These aspects are: security, usability and complexity on implementation (deployability). This paper presents an intensive study to instrument the comparison through the definition of metrics. Following table summarizes the metrics defined for each criterion.

| | |
|---|---|
| Usability | Memory-Effortless |
| | Scalable-for-Users |
| | Nothing-to-Carry |
| | Physical-Effortless |
| | Easy-to-Learn |
| | Efficient-to-Use |
| | Infrequent-Errors |
| | Easy-recovery-from-Loss |
| Deployability | Accessible |
| | Negligible-Cost-per-User |
| | Server-Compatible |
| | Browser-Compatible |
| | Mature |
| | Non-Proprietary |
| Security | Resilient-to-Physical-Observation |
| | Resilient-to-Targeted-Impersonation |
| | Resilient-to-Throttled-Guessing |
| | Resilient-to-Unthrottled-Guessing |
| | Resilient-to-Internal-Observation |
| | Resilient-to-Leaks-from-Other-Verifiers |
| | Resilient-to-Phishing |
| | Resilient-to-Theft |
| | No-Trusted-third-Party |
| | Requiring-Explicit-Consent |
| | Unlikable |

In the case of security criterion, the proposed metric set summarizes all the aspects that are usually estimated in defining a threat model. In the definition of these models it is necessary to adopt a number of decisions. And these decisions define the working scenario. For example in the case of OAuth 2.0 [5] the adopted assumptions are as follows:

The attacker has full access to the network between the client and authorization servers and the client and the resource server, respectively. The attacker may eavesdrop on any communications between those parties. He is not assumed to have access to communication between the authorization server and resource server.

An attacker has unlimited resources to organize an attack.

Two of the three parties involved in the OAuth protocol may collude to mount an attack against the third party. For example, the client and authorization server may be under control of an attacker and collude to trick a user to gain access to resources.

Attending to the metrics introduced above, is possible to determine that solutions corresponding to the higher security level (level 4) have poor performance in deployability and usability. Once the assessment of a system allows to determine in which level has to be deployed its authentication system, it is needed to evaluate if the users are authenticated safely and correctly. Although there are some tools that aid in this task [3], [6], deploys in the level 4 are difficult to evaluate correctly. In terms of usability, the use of tampering resistant hardware tokens goes against the adoption of these solutions by users, and it has been proved that this situation leads to a misuse of the credential systems. These tokens are expensive. They are independent devices that the user has to custody and that can be employed with one service provider only. If the users have to deal with more than one service provider that has adopted these tampering resistant hardware tokens, they have to take into custody as many tokens as service providers they have.

Furthermore, in terms of authorization, in [7] the authors explain that, aside from some security issues of each SDK, developers who choose to integrate with one of them make assumptions that can lead to security problems. This is because SDKs are often not well documented and the security exploits nearly always stem from attackers who find ways to violate these assumptions system implementers relied upon.

Along with these difficulties, other problems must be considered to understand the constant increase in fraud arising from the theft of digital identities. For instance, it is not possible to measure a homogeneous security level in all users' digital accounts. It is needed a solution that can equalize the security level of all digital accounts that a user owns. This solution should extend this security not only to the authentication processes but also to the resource authorization processes and all procedures related to such accounts.

In addition, numerous biometric identification and authentication techniques are in use nowadays for securing and accessing control applications. These biometric techniques include fingerprint identification, face recognition, retinal scan, iris scan, hand recognition, and voice or signature analysis. However, while there are many advantages to biometric authentication, several factors have limited its propagation due to some of the processes can be very intrusive, awkward and/or expensive.

REFERENCES

[1] Bonneau, J., Herley, C., van Oorschot, P. C., & Stajano, F. (2012, May). The quest to replace passwords: A framework for comparative evaluation of web authentication schemes. In Security and Privacy (SP), 2012 IEEE Symposium on (pp. 553-567). IEEE.
[2] Burr, W. E., Dodson, D. F., & Polk, W. T. (2006). Electronic authentication guideline. NIST Special Publication, 800, 63.
[3] Dalton, M., Kozyrakis, C., and Zeldovich, N., Nemesis: Preventing Authentication & Access Control Vulnerabilities in Web Application, In Proceedings of the 18th conference on USENIX security symposium, (pp. 267-282) USENIX Association.
[4] Evans, D., Bond, P., Bement, A., Security Requirements for Cryptographic Modules, FIPS PUB 140-2—FEDERAL INFORMATION PROCESSING STANDARDS PUBLICATION. Online Resource: http://csrc.nist.gov/publications/fips/fips140-2/fips1402.pdf
[5] McGloin M. & Hunt P. (2013, January) OAuth 2.0 Threat Model and Security Considerations. ISSN: 2070-1721. Online resource: http://tools.ietf.org/pdf/rfc6819.pdf.
[6] Sun, F., Xu, L., & SU, Z. (2011, August) Static detection of Access control vulnerability in web applications. In Proceedings of the $20^{th}$ USENIX conference on Security (pp. 11-11). USENIX.
[7] Wang, R., Zhou, Y., Chen, S., Qadeer, S., Evans, D., & Gurevich, Y. (2013). Explicating SDKs: Uncovering Assumptions Underlying Secure Authentication and Authorization (Vol. 37). Microsoft Research Technical Report MSR-TR-2013.
[8] DAILEY, Matthew D. Authentication Schemes based on Physically Unclonable Functions. 2009. Tesis Doctoral. WORCESTER POLYTECHNIC INSTITUTE.
[9]. DODIS, Yevgeniy; REYZIN, Leonid; SMITH, Adam. Fuzzy extractors: How to generate strong keys from biometrics and other noisy data. En Advances in cryptology-Eurocrypt 2004. Springer Berlin Heidelberg, 2004. p. 523-540.

SUMMARY OF THE INVENTION

Present invention provides in a first aspect a computer implemented method for securing operations in authentication and authorization systems using biometric information, wherein a first server receives, from a user having a computing device, a request to be logged into one of the services that the first server has and authenticates credentials information of the user in order to authorize said service request.

The provided computer implemented method is characterized by the use of a second server, in connection with the user computing device that has installed therein a dedicated program or mobile application, for receiving, from the first server, a first request about a status associated to said user in order to assist the first server in authorizing or rejecting the requested service logging. In case the requested service logging being authorized, and another request is done by the user to perform an operation in the first server, the second server also: receives a second request from the first server about a status that the user has set for said operation; evaluates the operation status to check if the first server being allowed to access the user configuration for said operation and sends the result of the operation status to the first server.

Then, if said result is set as valid, an extra authentication factor mechanism including a biometric identity verification of biometric information of the user is used, so that allowing the second server confirming authentication of the user, and the second server including a one-time password within the sending of the operation status result to the first server.

The biometric information can include a fingerprint, a voice scan, a facial scan, an iris scan, a palm scan, among others.

In accordance with the invention, the first request performed by the first server comprises: a credential exchange between the first server and the second server in order to provide mutual authentication; verification, by the second server, of said associated status of the user, said associated status been previously set as valid or as invalid by said user and stored in a memory of the second server; and the sending, by the second server, of the associated status of the user to the first server.

The credentials exchange to secure mutual authentication between the first server and the second server, is performed, preferably, via a standard authentication procedure based on certificates' exchange defining, as a result, a secured channel. The exchange is performed to verify that both first server and second server are who they claim to be.

The second server may notify the user in case said request to be logged into a service of the first server is rejected. For instance, by the sending of a Short Message Service (SMS), of an email, of or a message by a smartphone messenger application, or just by the highlighting or pushing in said dedicated program of said user computing device.

The associated status is set as valid (unlocked) or as invalid (locked) a certain period of time and can be modifiable by the user whenever the latter want it. For instance, the user can plan a locking/unlocking policy to automate the management of their accounts held with different servers using different criteria: time, geolocation (different policies for home, work, etc.). Another possibility for modifying said associated status can be by delegating the control said user has of their accounts to other users. This can be done by considering two different options. In the first one, a parental control mechanism is used so the children's (original) accounts access control is delegated to the parent control mechanism. In the second one, a single account allows multiple locks. In this latter case, the unlock action will require that multiple users unlock their locks concurrently. In both cases, the delegation is performed securely maintaining the privacy of every user unchanged.

In addition, the request to be logged into a service and/or the request to perform an operation may be recorded in order to provide statistics. In this way, the user can obtain system usage statistics that reflect activity of the system and track the attempts of impersonation. These statistics inform about when someone had attempted to access to a service with user's username.

According to an embodiment, the extra authentication factor mechanism including the biometric identity verification of biometric information of the user and generation of tokens that can be used as one-time passwords (OTP) is performed by the second server by:
recovering a previously stored biometric signature of the user and a vector of weights thereof;
selecting a set of coefficients of said stored biometric signature to be used as cryptographic key, hashing the selected set of coefficients to produce a valid key, and generating a helper string; and
ciphering the OTP with the produced valid key and sending the ciphered OTP together with at least the generated helper string to the dedicated program.

After that, the dedicated program captures a biometric signature of the user, said captured biometric signature being captured by employing the same biometric technique as said stored biometric signature; and uses the received helper string to determine the set of coefficients to be used at least for said captured biometric signature of the user and hashes the set of coefficients to produce the valid key for deciphering the received OTP.

Preferably, the biometric signature of the user and the vector of weights are stored in the second server after the dedicated program having run a training procedure. The training procedure includes the capture of different biometric measures from the user according to predefined patterns generated by the second server and the processing of the biometric measures for performing the calculation of the biometric signature and of the vector of weights.

As an improvement of the invention, a random number can also be employed, as a cryptographic salt, to increase the entropy of the cryptographic key and to avoid replay attacks in the generation of the helper string.

In a second aspect the invention proposes a communications system for securing operations in authentication and authorization systems using biometric information, wherein a first server is configured to receive from a user having a computing device, a request to be logged into a service therein and to authenticate credentials information of said user in order to authorize said service request.

The communications system is characterized by including a second server, in connection with said user computing device that has installed therein a dedicated program, which is configured to:
 receive, from the first server, a first request about a status associated to said user in order to assist the first server in authorizing or rejecting the requested service logging;
 receive, from the first server, and in case said requested service logging being authorized and a request is done by the user to perform an operation in the first server, a second request about a status that the user has set for said operation;
 evaluate the operation status to check if the first server is allowed to access the user configuration for said operation; and
 send the result of the operation status to the first server including a one-time password (OTP), in case the result been set as valid and an extra authentication factor mechanism including a biometric identity verification of biometric information of the user is used.

In the communication system to perform the extra authentication factor mechanism including the biometric identity verification of biometric information of the user, the second server preferably includes a plurality of modules that are further configured to:
 recover, by a server biometric module, a previously stored biometric signature of the user and a vector of weights thereof;
 select, by a generation module, a set of coefficients of said stored biometric signature to be used as cryptographic key, hash the selected set of coefficients to produce a valid key, and generate a helper string; and
 cipher, by a cipher module, the generated OTP with the produced valid key and sending, by a sender module, the ciphered OTP together with at least the generated helper string to the dedicated program.

Moreover, the dedicated program preferably also includes a plurality of modules that are configured to:
 capture, by a biometric module, a biometric signature of the user;
 receive, by a receiver module, the sent ciphered OTP together with the generated helper string and the captured biometric signature of the user;
 determine, by a reproduction module using at least the generated helper string, the set of coefficients to be used for said captured biometric signature of the user and to hash the set of coefficients to produce the valid key; and
 decipher, by a deciphering module, the received OTP using the produced valid key.

The subject matter described herein can be implemented in software in combination with hardware and/or firmware, or a suitable combination of them. For example, the subject matter described herein can be implemented in software executed by a processor.

According to a third aspect the invention provides a computer program comprising computer program code means adapted to perform the steps according to the computer implemented method of the first aspect of the invention when said program is run on a computer, a digital signal processor, a field-programmable gate array, an application-specific integrated circuit, a micro-processor, a micro-controller, or any other form of programmable hardware.

Embodiments of the invention also comprise a computer program product including program code means adapted to perform other embodiments of the invention according to the methods of claim 3, or 5.

BRIEF DESCRIPTION OF THE DRAWINGS

The previous and other advantages and features will be more deeply understood from the following detailed description of embodiments, with reference to the attached, which must be considered in an illustrative and non-limiting manner, in which.

DETAILED DESCRIPTION OF THE INVENTION AND OF SEVERAL EMBODIMENTS

Figure 1:
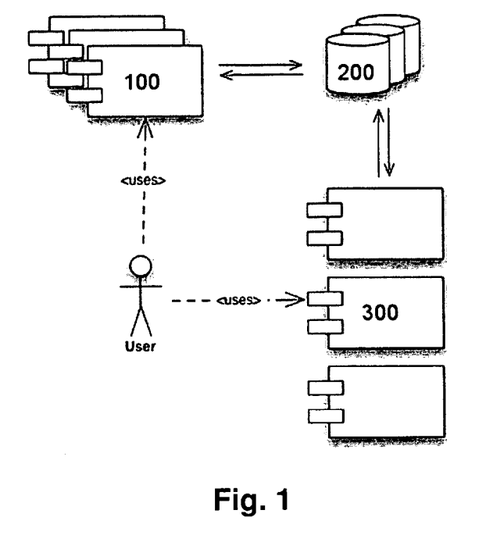
FIG. 1 is an illustration of the present invention general architecture.

In reference to FIG. 1 it is showed the general architecture of the present invention. Concerning FIG. 1, a user computing device 100 such as a mobile phone, a smartphone, a tablet-PC or a PDA among any other, is used by said user in order to login into a dedicated program 102 in communication with a second server 200 and to manage the status for every first server 300 with which a user wants to request a service.

With this new proposal said user 100 can unblock said operation defined for a particular account created with said first server 300. As stated below, this action can enhance the control defined for this account by decision of the first server 300. In this decision, the first server 300 can choose to incorporate a new control of security beyond the block/unblock default option or the second authentication factor. This control of security consists of to provide a communication channel from the user 100 to the first server 300, through the second server 200. The first server 300 can configure the system to ask the user 100 for a particular information related to said operation to be performed. This information can be used by the second server 200 to verify if the user 100 is who actually is demanding said operation and to confirm if the operation that has arrived to the first server 300 is exactly as the one the user 100 had ordered.

Assuming that the first server 300 could want to verify the integrity of the operation, it can be selected what parameters are critical to ensure the operation integrity. In this case, it is important that the requested information corresponds univocally with the operation critical parameter in order to identify it correctly.

In this architecture, the user 100, besides having an account in the second server 200, can have multiple accounts with different service providers. One of these service providers is the first server 300. Once the user 1'00 completes the login process with these accounts he or she will have access to multiple operations specific to each service providers. The second server 200 eases how a first server 300 can integrate this control within the logic of its applications.

When a first server 300 decides to integrate its services, it will provide the ability to link their accounts with the accounts that the user 100 has in the second server 200. When the said user 100 decides to establish this link, she or he starts a pairing process that ensures complete privacy to the user 100. Once the pairing process is completed, the user 100 can access the configuration of the control of the account with the first server 300 from a dedicated program 102 (i.e. a mobile application).

Every time the settings associated with an account are changed on said mobile application, this modification is immediately propagated to the second server 200 to change the status of the account that can be accessed by the first server 300.

Second server core implements the main function of the second server 200: lock or unlock said user account with the first server 300 and the operations provided by first server 300. In order to do that, the second server 200 accepts and processes the check-status requests sent from the first server 300. This second server 200 also manages all data about the links with said first server 300 defined by the user 100 and the requests for the pairing of new locks. The key is the user 100 is never asked for any private information. Once the user 100 creates his account with second server 200, he can establish locks with different service providers, like said first server 300. To activate these locks the second server 200, according to an embodiment, generates a token. A unique token and the definition of secured channels are needed to complete the pairing process between the user 100 and the first server 300. As result of this pairing process, the cryptographic token is sent from the second server 200 to the first server 300 who has to store this information with their user's personal data. Later, this cryptographic token will be used to request the corresponding lock status. The user 100 can modify the status of their locks, by the activation or configuration of the different options that second server 200 provides.

In case the user 100 has set up a lock with a second factor for authentication over an account or a particular action, the second server 200 will incorporate all the needed logic for the generation and communication of the OTP. When the second server 200 receives a request from the first server 300 asking for the user account status, a second authentication factor is triggered. An OTP is generated and sent to the user 100. The same OTP is sent to the first server 300 along with the account status. If the status is ON and the user 100 has activated the second factor, the first server 300 should prompt the user to introduce the OTP to proceed with the operation.

Now, if the user 100 has set up a lock over a said operation with an integrity factor to verify that the operation parameters have not been modified, said second server 200 incorporates the needed logic to get the critical information from the user 100 and from the first server 300 and to check if both are equal. The second server 200 sends the result of the checking as the account status to the first server 300. In case of mismatching, the first server 300 can conclude that an intruder can be intercepting the information from the user 100. The first server 300 can then build mechanisms to elude the fraud and to raise security alerts.

Figure 2:
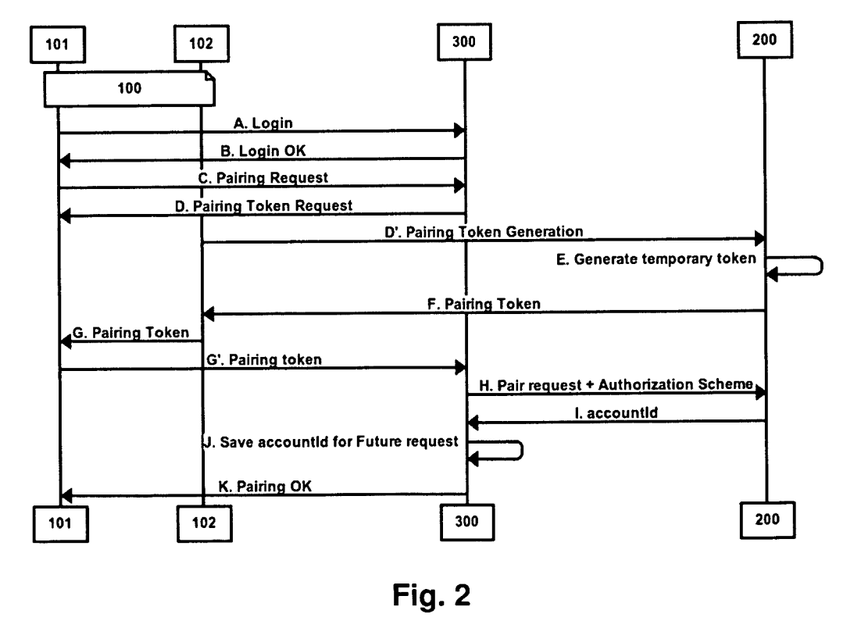
FIG. 2 is a flow diagram illustrating an account pairing sequence with authorization.

In reference to FIG. 2 it is illustrated a pairing process of the user 100 account of the second server 200 with different accounts for different first servers 300. In FIG. 2, once a user 100, using for instance the dedicated program 101 such as a browser, has completed the login process (A-B) with a first server 300 (in this particular case a Bank online, a social network, a credit card providers, etc.), the user 100 decides to perform said accounts' pairing process. The user 100 requests the pairing to the first server 300 (C) using the browser 101. As response, the first server 300 asks for a pairing token (D). The user 100 then uses the dedicated program 102 (D') to get this pairing token from the second server 200, after a previous login process. The second server 200 generates a token (for instance as an OTP) (E) and sends it to the user's dedicated program 102 (F). This token can be used for several pairing processes meanwhile it is valid. The user get the token (OTP) from the dedicated program 102 and introduces it in the web page displayed in the browser 101 by the first server 300 (G-G'). The first server 300 then sends the received token to the second server 200, after a previous credentials exchange (H). If the first server 300 identity is validated, the second server 200 stores the link between the user 100 and the first server 300 and generates a new token that identifies this link. This token (accountID) is sent to the first server 300 (I) and there it is stored for future communications (J). At last, a pairing acknowledges is sent to the user's browser 101 (K).

Figure 3:
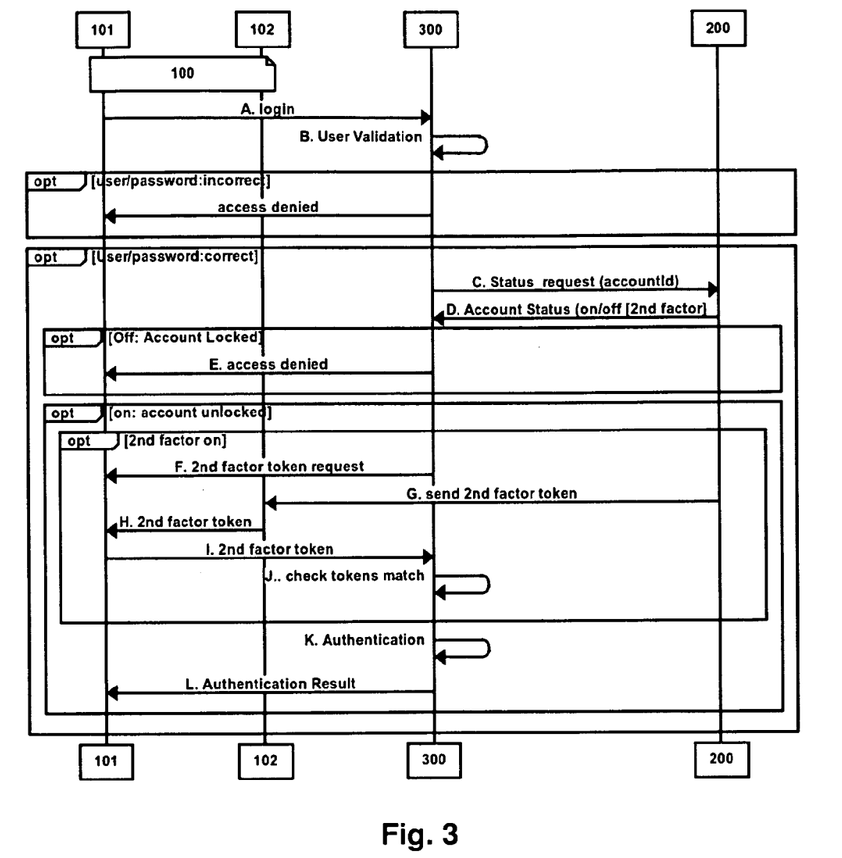
FIG. 3 is a flow diagram illustrating how a status of a user account can be checked for authentication.

In reference now to FIG. 3 it is illustrated how a status of a user account can be checked for authentication. In FIG. 3, a user 100, using for example a browser 101, requests to be logged in a service (A) of a first server 300 so once user existence has been validated (B) by said first server 300, the latter demands to the second server 200 the user account status (C). Then the second server 200 initializes the credentials exchange before the result of the account status information is sent (D). With the result status, the first server 300 makes the decision of allowing or blocking the user access (E).

In an embodiment, if the account status is unlocked or valid but the second authentication factor is on, within the answer of the status request, the second server 200 sends an OTP to the first server 300 that has to employ to complete the authentication. The first server 300 then requests to the user 100 the OTP that is going to be a temporal second factor (F). Then the second server 200 sends the same OTP to to the user's dedicated program 102 (G). The user 100 recovers the OTP from the dedicated program 102 and introduces it in the browser 101 (H) and sends it to the first server 300 (I). The first server 300 can check if the OTP sent through the browser 101 matches with the one received with the account status (J). Depending on of the results of this verification, the first server performs the authentication process (K) and communicates the result to the user via 101.

When a first server 300 sends a Status_Request, the second server 200 understands that someone, with the proper service identification information (i.e. ID and password), is trying to access to the service. If the account status is set as blocked, or if this request has come in a moment that is not included in the interval defined by the user 100, the second server 200 registers this event as a fake attempt. The second server 200 could send, according to an embodiment, an alert of this event to the user if said user has configured it so (for instance by sending a Short Message Service (SMS), an email, a message by a smartphone messenger application, by a highlighting or pushing in said dedicated program 102 of said user computing device 100, etc.) or just update the statistics for a later revision. Then the second server 200 returns the status associated with the account as locked.

With the aim of improving the security of any authorization system, the use of the said second server 200 is proposed as a new layer that gives the users the chance of control the access to the resources and procedures associated with their accounts defined with any first servers. These resources and procedures are seen as operations which depend on the main actions defined for an account (i.e. login process). This dependency is established like a hierarchy where the changes in the root entries are propagated to their children.

In addition to that, the usage of "out of band" channels allows to provide a secure solution to communicate the users and the service providers. So far, the invention has built an OTP exchange using this secure channel in order to increase the level of authentication. Now, the first server can determine if the user 100 wants that an operation has a particular status (locked or unlocked) and it can check if this user 100 is in possession of the credentials of her/his account with the second server 200 to receive the token used as second authentication factor. This is only a particular usage that can be deployed using this extra secure channel as it is also, for example, the usage of this channel by the service providers to alert the users about information of their particular interest (e.g. anomalies detected with their credentials). At this point, the invention also increases the authentication level of the solution reinforcing the second factor previously described. This reinforcement relies on biometry information to allow the second server 200 to check if the one who is possession of the credentials needed to interact with the system is, in fact, the user her/himself. The final goal is to protect the system against theft of the user's credentials. It is important to point that this solution does not mean any protection if the device where the users introduce their credentials is compromised (man in the device).

The invention considers that the dedicated program 102 is able to capture and process the user's 100 biometric data to produce a key that can be used to cipher and decipher the information sent from the second server 200 or by the first server 300 through the second server 200. The source of the information does not affect the procedure itself. The fact is that the first server 300 can rely on that the person who receives this information is who is expected to be, because the second server 200 performs a biometric verification. In consequence, the same process is required to the second server 200 but the first server 300 does not need to integrate these procedures. The efforts performed by the first server 300 are only related with the process of the information (e.g. processing the OTP received).

Furthermore, in the invention, for managing the second authentication factor, the token that is going to be used as OTP not only proves that the user 100 who is requesting an operation has the second server 200 legitimate user's credentials but also demonstrates that this user 100 is whom claim to be. Therefore the protection to deal against the theft of the device or the user's second server credentials taking into account this biometric data is increased.

The main idea is to be able to generate a crypto key from the biometric features previously registered for a particular user by the second server 200 during a training phase. This training phase supposes that when the user 100 decides to operate with a reinforced extra authentication factor mechanism, or it is the service provider (first server 300) who configures its operations in this way, the dedicated program 102 installed on the user's device runs a training procedure. This procedure requires the user 100 to facilitate different biometric measures according prefixed templates. This is done several times with minor changes in the subsequent patterns. Every time the user 100 completes a measurement, the dedicated program 102 processes the biometric data acquired and calculate the biometric signature that identifies the user 100. Typically, this signature can be seen as a sequence of coefficients: $C=(C_0, C_1, C_2, \ldots, C_N)$, where N is the maximum number of coefficients that depends on the biometric technique employed.

One of the topics unavoidable when any biometric technique is employed is the need to deal with certain level of uncertainty in this biometric signature coefficients calculation. That is, because the source of information to be processed is a human characteristic that must be measured, the intrinsic variable nature of these characteristics or the problems related with the measurement process, usually make less probable obtain exactly the same coefficients for the same person for every measure process. For that reason, in the invention the final goal of this phase is to profile every user 100 with two vectors using a prefixed collection of patterns: one vector whose coefficients are the biometric coefficient returned by the biometric technique (C), and other vector with the uncertainty associated with every one of these coefficients ($\sigma$).

Based on the information given by the vector $\sigma$ it is possible to determine which biometric coefficients define the correspondent user with less uncertainty. However, this is agnostic of the meaning of the coefficients. Depending on the biometric technique applied, the significance in terms of discriminatory power of the coefficients does not need to be homogenous. Sonie of these coefficients can be more valuable than others in the identity verification of a given speaker (user), so that it can be defined a vector of weights W:

$$W = \left(\frac{\tau_0}{\sigma_0}, \frac{\tau_1}{\sigma_1}, \frac{\tau_2}{\sigma_2}, \ldots, \frac{\tau_N}{\sigma_N}\right),$$

where $\tau_i$ and $\sigma_i$ represent the significance of the coefficient i in a particular speaker verification and the uncertainty of this coefficient measured during training phase respectively. Every component $$W_i = \frac{\tau_i}{\sigma_i}$$

of vector W would determine the effectiveness of the coefficient i contribution in the overall user recognition process.

For the training phase, two operation modes have been designed to gain in flexibility: the first mode implies to send all the data associated with the process performed on every word to the second server 200 once all the repetitions to be completed. Later, in the second server 200, once all the repetitions have been received, it is possible to select which method apply to determine the level of uncertainty associated with a particular speaker and obtain the level of uncertainty related with every coefficient of his/her biometric signature. The second mode takes advantage of those mobile devices of high computing capacity that can assume the performance cost of executing all the procedures exposed before. Therefore, this mode achieves one transmission that contains the average coefficients and the calculated tolerance vector related with a particular user and his/her associated level of uncertainty.

Figure 4:
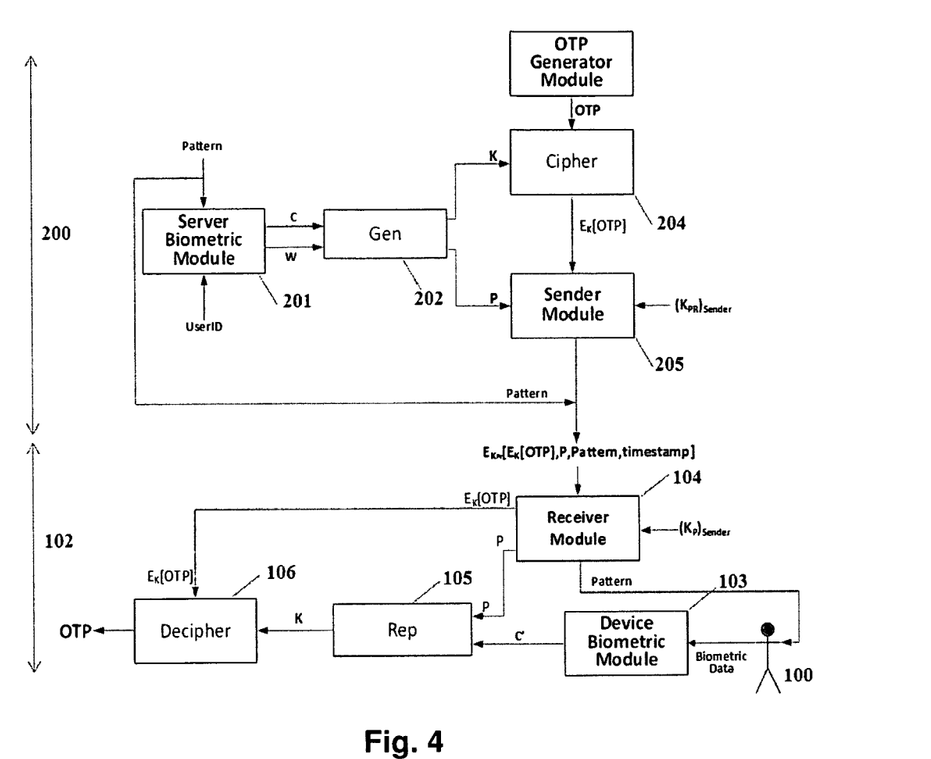
FIG. 4 illustrates the general structure of the proposed mechanism to reinforce the extra authentication factor mechanism by including a biometric identity verification of biometric information of the user.

With reference to FIG. 4, this figure illustrates the overall architecture to reinforce the extra authentication factor mechanism with a biometric identity verification of the user 100. The procedure executed to obtain a cryptographic key from the proposed biometric is based on the usage of a fuzzy extractor built from secure sketches [8] [9]. By definition, a fuzzy extractor is a pair of randomized procedures: generation (Gen) 202 and reproduction (Rep) 105. Given the coefficients derived from the biometric technique employed (C), the Gen procedure produces a string K and a helper string P as output. Both depend on the techniques included in the Fuzzy Extractor definition. In the invention, once they are produced, the string K is the crypto key that can be used to cipher the message in a cipher module 204 (i.e. the token used as OTP) and the string P can be used to deal with variability related to the usage of biometric techniques. The Rep procedure takes as inputs the biometrical coefficients calculated by a biometric module 103 of the dedicated program 102 from an audio signal (C') and the helper string P and, if C' is close enough to C, it outputs the string K that can be used to decipher 106 the message. So, from a general point of view, to deal with the uncertainty related with the biometric techniques it is necessary to bundle with the ciphered message (e.g. $E_K$[OTP]) the helper string P.

The process begins when a particular pattern is selected for a specific user (UserID). This pattern depends on the biometric technique employed and it is proposed to expand the space defined by the features that this technique is able to extract from a user. For example, if the biometric technique used is based on the user's voice this pattern can be a subset of the words used during the training of the system (e.g. in the case of techniques based on prefixed text) or a synthetic filter used in the case of techniques without a prefixed text. In this figure appear two modules—Sender Module 205 and Receiver Module 104—that model any secure communication scheme based-on public ($K_P$)/Private ($K_{PR}$) key cryptography (e.g. SSL).

As stated before, the invention offers protection against credentials leakage or device theft. Therefore, the invention is designed to be resistant against replay attacks or brute force attacks deployed once the credentials are compromised. Furthermore, the proposed design takes into consideration that part of the solution will be executed in a low-performance computing device such as a smartphone, etc. To deal with these matters, the alternative employed in this invention means to propose a particular design of these Gen and Rep procedures. Some of the modification can be seen in FIG. 4 where the generation module 202 not only receives the biometric coefficient vector but also it receives information related with the accuracy of any of these coefficients (W).

Figure 5:
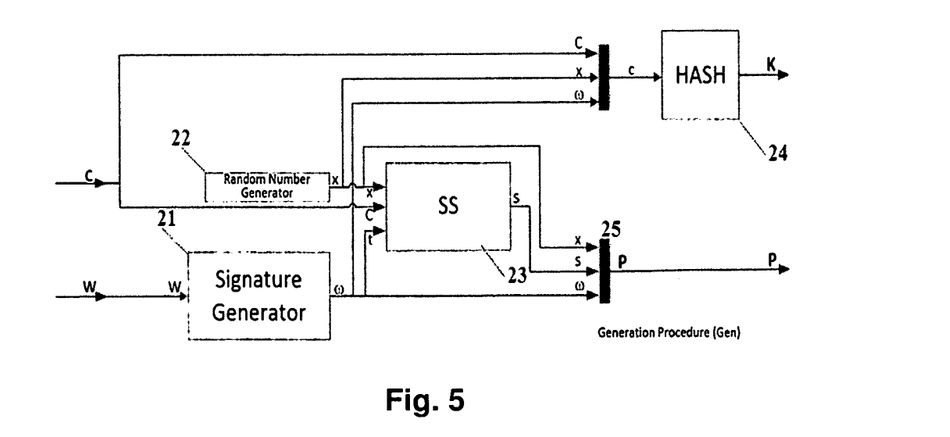
FIG. 5 illustrates the proposed structure for the proposed generation (Gen) procedure.
Figure 6:
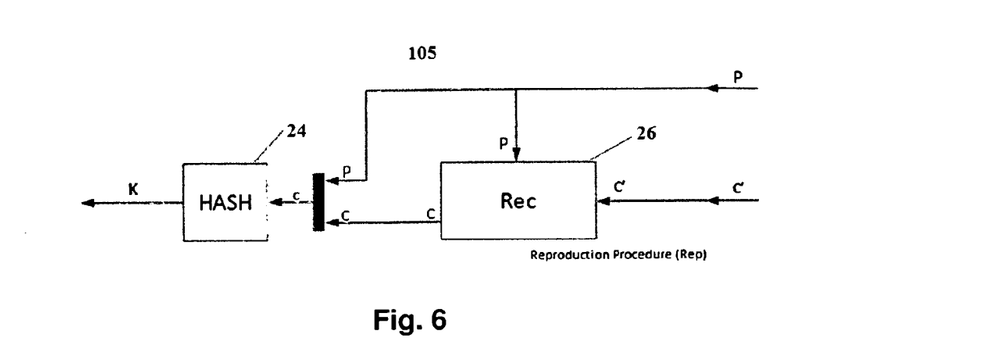
FIG. 6 illustrates the proposed structure for the proposed reproduction (Rep) procedure.

FIG. 5 illustrates the proposed Gen procedure 202 reinforced with the usage of hashes and random values, and FIG. 6 illustrates the corresponding procedure Rep 105. Once the Gen procedure receives the vector (W) whose coefficients give information about the uncertainty of any biometric estimators, a subset ($\omega$) of these estimators is defined. The selection of estimators of this subset depends on two aspects: performance and security. The number of elements contained in $\omega$ impacts on the performance of the Rep procedure. Due to Rep must be executed by the dedicated program 102 on a low performance computing device the number of elements in $\omega$ can be parameterized and later adjusted according with the computation power estimated for every user.

There exists, however, a low limit in the number of elements. The number of elements in $\omega$ determines how many biometric coefficients are used to produce a crypto key. Leaving apart that the complexity of the key is increased by the usage of a hash function, the unique information related with the user 100 is expressed in terms of these coefficient, so it is needed a minimum number of them. In fact, to increase the entropy of this crypto key, a random number (x) is added in the key computation as a cryptographic salt. Then, the subset $\omega$ is then employed to determine what biometric coefficients use to generate a crypto key and a random number x is added to avoid that the same subset of biometric coefficients (c) produce the same key anytime they are selected. This x prevents attackers from easily building a list of hash values for common keys and prevents keys cracking efforts from scaling across many communications.

With the vectors $\omega$ and C it is possible to determine the subset (c) of coefficients employed to generate a crypto key. To be able to deal with the variability of biometric techniques a secure sketch (SS) is proposed to produce the information (s) that guarantee the recuperation of biometric data from a C' similar enough to C. These secure sketches allow for a straightforward construction of fuzzy extractor with the flexibility in terms of the error-correcting capability. To avoid any leakage of information a random number (x) is again employed to avoid the guessing of this s and produce the helper string P that will be sent to the dedicated program 102.

Once the dedicated program 102 receives the pattern it can measure then biometric data from the user 100 and obtain a C'. At same time, the program 102 recovers the P string where it can find the information s to assure that C can be determined from C'. The data contained in the P string also facilitates the computation of the crypto key K, once C is recovered.

Figure 7:
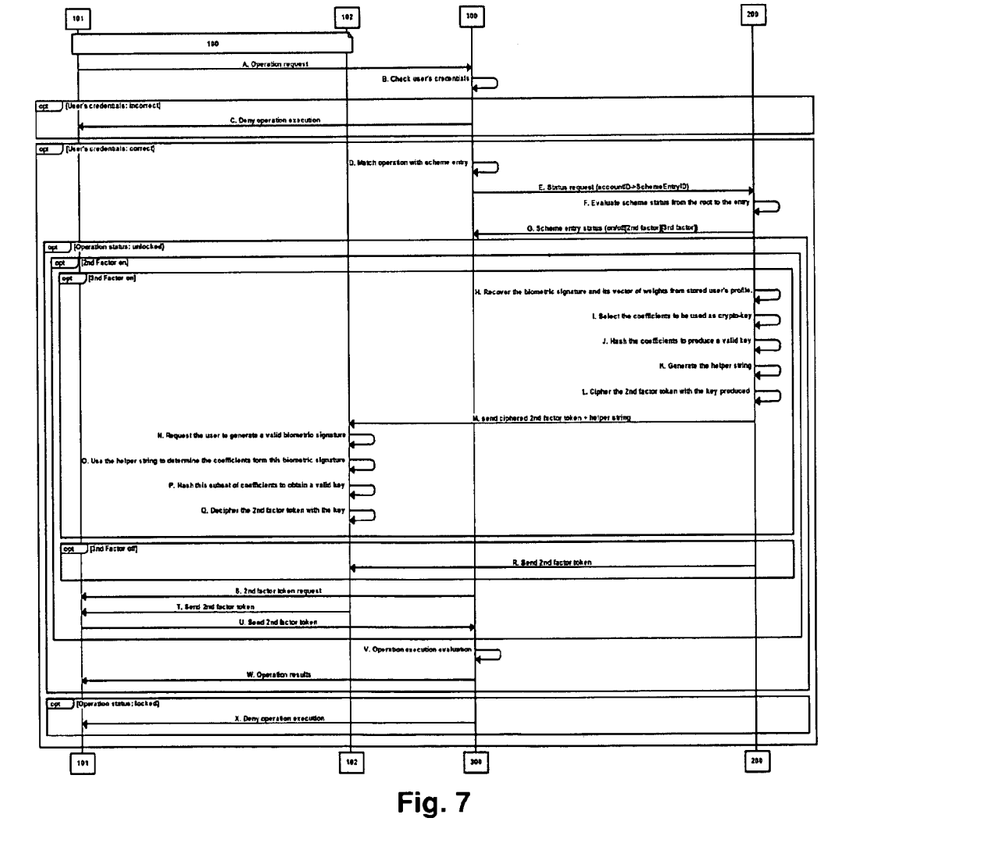
FIG. 7 is the flow diagram illustrating the embodiment in which the proposed extra authentication factor is reinforced with biometric information of the user.

In reference to FIG. 7 it is showed the operation status verification process including the proposed extra authentication factor mechanism reinforced with biometric information of the user 100. This operation is proposed by the first server 300 attached to the account management. The user 100, once correctly logged in the first server 300 as previously explained, requests to execute using for example a browser 101 an operation related with an account (A) of the first server 300. This operation can be for instance to execute some action related with the services provided by first server 300 (e.g. Internet payment with a credit card). So once user existence has been validated (B) by said first server 300, the latter makes the correspondence of the operation requested with the entry in the hierarchy defined by this user's account (D) and demands to the second server 200 this entry status (E).

Then the second server 200 initializes the credentials exchange before evaluating the scheme entry status from the root to the entry (F). The status of the user's account is retrieved and if it is unlocked the same evaluation is performed with every step founded until reach the scheme entry. The scheme entry status information is sent (G) and, with this information, the first server 300 makes the decision of allowing or blocking the user access to the operation. If the scheme entry status is unlocked and the second authentication factor is activated, the second server 200 sends an OTP to the first server 300 within the answer of the operation status request. This first server 300 has to employ it to complete the authentication. The first server 300 request to the user 100 the OTP that is going to be a temporal second factor (S)

If the status of the scheme entry is unlocked and the second authentication factor is reinforced with the biometric identity verification then the second server 200 has to recover the biometric signature and the vector of weights from storage for the user 100 in particular (H). By using these vectors, it has to select a subset of coefficients to be used as the seed of a robust cryptographic key (I). Then the system implemented in second server 200 can hash this coefficients to produce a valid key (J) and generate a helper string P that allows to deal with the inherent variability of biometric approaches (K). With the crypto key it ciphers the token used as OTP (L) and the output of this process is bundled with the helper string P and all the information needed to facilitates the task of deciphering this information to the dedicated program 102 handled by the user 100 (pattern, timestamps, etc.).

The second server 200 sends all this information to the to the user's dedicated program 102 (M) that receives the information and requests to the user 100 to generate a valid biometric signature based on the pattern received (N). Once a new biometric signature is captured the system uses the helper string P to determine the subset of coefficients to be used as the seed of the expected crypto key (O). And then it hashes this subset with other parts of the helper string P to produce the crypto key (P) and uses it to decipher the OTP (Q) requested by the first server 300 (S). The user 100 recovers the OTP from the dedicated program 102 and introduce it in the browser 101 (T) and sends it to the first server 300 (U). The first server 300 can check if the OTP sent through the browser 101 matches with the one received with the account status (V). The first server 300 denies operation execution if the OTPs don't fit.

Figure 8:
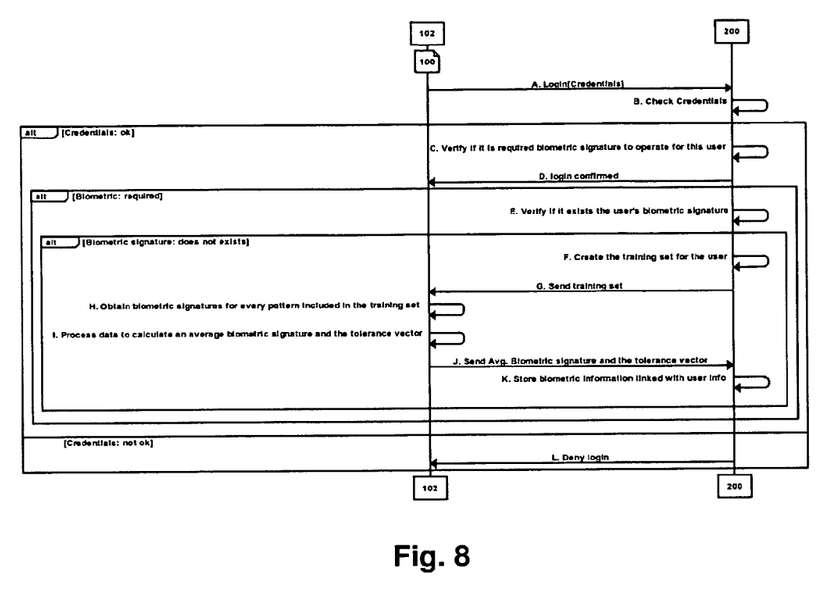
FIG. 8 is the flow diagram illustrating the training process proposed by the invention.

FIG. 8 illustrates the process defined to obtain user's biometric information to perform the later user recognition. Once the user 100 tries to initiate a session with the second server 200 using the dedicated program 102 installed in her/his mobile device, s/he must provide valid credentials (A) that the second server 200 will check (B) before confirm the login (D). When the second server 200 verify the correctness of the credentials it also retrieves the profile information in order to know if there is biometric information attached in it and if this information must exist (C). If the user 100 have to had provided biometric information to interact with the first server 300, there must be stored a valid biometric signature and a vector with the information of the tolerance of any of the coefficients included in that signature (E).

In the case that this signature would be required but it does not exist in the system, it is necessary to request the user 100 to participate in a training process. Before the training process, a set of patterns is generated by the second server 200 (F) and it is sent to the dedicated program 102 (G). Once this set is received in the dedicated program 102, the patterns are used one by one to be presented to the user 100 in order to calculate the correspondent biometric signature (H). In the case showed in FIG. 8 8 it is the dedicated program 102 which is in charge of calculate the average biometric signature from all the samples pre-calculated. During this calculation, it is possible to determine the tolerance associated to every coefficient (I). As it is explained before, this tolerance give information about how discriminatory is a coefficient in the duty of recognizing this particular user 100. However, in some circumstances, it can be needed to configure the dedicated program 102 to send the data obtained from the user 100 to the second server 200 without process it. In this case, the biometric procedures will be computed in the second server 200. Once the average signature and the tolerance vector are determined, they are sent to the second server 200 (J) that stores them within the profile of the user 100 (K), ready to be used when an operation status request will be received and it is configured with this reinforced extra authentication factor mechanism.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

The invention claimed is:

1. A computer implemented method for securing operations in authentication and authorization systems using biometric information, the method comprising:
   receiving, at a first server, from a user having a computing device, a request to be logged into a service of said first server; and
   authenticating, at said first server, credentials information of said user in order to authorize said first server service request;
   using a second server, in connection with said user computing device that has installed therein a dedicated program, for receiving, from the first server, a first request about a status associated to said user in order to assist the first server in authorizing or rejecting the requested service logging, and in case said requested service logging is authorized, and another request is made by the user to perform an operation in the first server:

receiving, by the second server, a second request, from the first server, about a status that the user has set for said operation, evaluating, by the second server, said operation status to check if the first server is allowed to access the user configuration for said operation, sending, from the second server, the result of the operation status to the first server, and if said result has been set as valid, using an extra authentication factor mechanism including a biometric identity verification of biometric information of the user, so that the second server is allowed to confirm authentication of the user, and the second server includes a one-time password (OTP) within the operation status result sent to the first server, wherein the extra authentication factor mechanism includes:

recovering, at the second server, a previously stored biometric signature of the user (C) and a vector of weights (W) thereof;

selecting, by the second server, a set of coefficients ($C_0$, $C_1$, $C_2$, ..., $C_N$) of said stored biometric signature (C) to be used as cryptographic key, hashing the selected set of coefficients ($C_0$, $C_1$, $C_2$, ..., $C_N$) to produce a valid key (K), and generating a helper string (P);

ciphering, by the second server, the OTP with the produced valid key (K) and sending the ciphered OTP together with at least the generated helper string (P) to the dedicated program;

capturing, by the dedicated program, a biometric signature of the user (C'), said captured biometric signature (C') being captured by employing the same biometric technique as said stored biometric signature (C); and using, at the dedicated program, the received helper string (P) to determine the set of coefficients ($C_0$, $C_1$, $C_2$, ..., $C_N$) to be used at least for said captured biometric signature of the user (100) (C') and hashing the set of coefficients ($C_0$, $C_1$, $C_2$, ..., $C_N$) to produce the valid key for deciphering the received OTP.

2. The computer implemented method of claim 1, wherein said first request done by the first server comprises:

a credential exchange between the first server and the second server in order to provide mutual authentication;

verification, by the second server, of said associated status of the user, the associated status been previously set as valid or as invalid by said user and stored in a memory of the second server; and sending, by the second server, the associated status of the user to the first server.

3. The computer implemented method of claim 1, wherein the biometric signature of the user (C) and the vector of weights (W) are stored in the second server after the dedicated program has run a training procedure.

4. The computer implemented method of claim 3, wherein the training procedure includes the capture of different biometric measures from the user according to predefined patterns generated by the second server, and the processing of the biometric measures for further calculating said biometric signature (C) and said vector of weights (W).

5. The computer implemented method of claim 1, further comprising employing a random number (x), as a cryptographic salt, to increase the entropy of the cryptographic key and to avoid replay attacks in the generation of the helper string (P).

6. The computer implemented method of claim 1, wherein the biometric information includes at least one of a fingerprint, a voice scan, a facial scan or an iris scan.

7. The computer implemented method of claim 1, wherein the second server notifies the user if the request to be logged into a service of said first server is rejected, said notification comprising at least one of a sending of a Short Message Service (SMS), a sending of an email, a sending of a message by a smartphone messenger application, and/or a highlighting or pushing in said dedicated program of said user computing device.

8. The computer implemented method of claim 2, wherein said associated status is set as valid or as invalid a certain period of time.

9. The computer implemented method of claim 1, wherein the request to be logged into a service of the first server and/or the request to perform an operation in the first server are recorded in order to provide statistics.

10. A communications system for securing operations in authentication and authorization systems using biometric information, comprising a first server configured to receive, from a user having a computing device, a request to be logged into a service of the first server and to authenticate credentials information of said user in order to authorize said service request, the system comprising:

a second server, in connection with said user computing device that has installed in the user computing device a dedicated program, the second server configured to:

receive, from the first server, a first request about a status associated with said user in order to assist the first server in authorizing or rejecting the requested service logging;

receive, from the first server, and in case said requested service logging is authorized and a request is made by the user to perform an operation in the first server, a second request about a status that the user has set for said operation;

evaluate said operation status to check if the first server is allowed to access the user configuration for said operation; and send the result of the operation status to the first server, the result including a one-time password (OTP), in case said result has been set as valid and an extra authentication factor mechanism including a biometric identity verification of biometric information of the user is used, wherein to perform the extra authentication factor mechanism the second server includes a plurality of modules configured to:

recover, by a server biometric module, a previously stored biometric signature of the user (100) (C) and a vector of weights (W) thereof;

select, by a generation module, a set of coefficients ($C_0$, $C_1$, $C_2$, ..., $C_N$) of said stored biometric signature (C) to be used as cryptographic key, hash the selected set of coefficients ($C_0$, $C_1$, $C_2$, ..., $C_N$) to produce a valid key (K), and generate a helper string (P);

cipher, by a cipher module, the generated OTP with the produced valid key (K); and send, by a sender module, the ciphered OTP together with at least the generated helper string (P) to the dedicated program; and wherein the dedicated program includes a plurality of modules configured to:
  capture, by a biometric module, a biometric signature of the user (C');
  receive, by a receiver module, the sent ciphered OTP together with the generated helper string (P) and the captured biometric signature of the user (C');
  determine, by a reproduction module by using at least the generated helper string (P), the set of coefficients ($C_0, C_1, C_2, \ldots, C_N$) to be used for said captured biometric signature of the user (100) (C') and to hash the set of coefficients ($C_0, C_1, C_2, \ldots, C_N$) to produce the valid key; and
  decipher, by a deciphering module, the received OTP using the produced valid key.

11. A computer program product, which includes computer program code instructions that when executed in a computer perform a method comprising:
  receiving, at a first server, from a user having a computing device, a request to be logged into a service of said first server; and
  authenticating, at said first server, credentials information of said user in order to authorize said first server service request;
  using a second server, in connection with said user computing device that has installed therein a dedicated program, for receiving, from the first server, a first request about a status associated to said user in order to assist the first server in authorizing or rejecting the requested service logging, and
  in case said requested service logging is authorized, and another request is made by the user to perform an operation in the first server:
    receiving, by the second server, a second request, from the first server, about a status that the user has set for said operation,
    evaluating, by the second server, said operation status to check if the first server is allowed to access the user configuration for said operation,
    sending, from the second server, the result of the operation status to the first server, and
    if said result has been set as valid, using an extra authentication factor mechanism including a biometric identity verification of biometric information of the user, so that the second server is allowed to confirm authentication of the user, and the second server includes a one-time password (OTP) within the operation status result sent to the first server,
  wherein the extra authentication factor mechanism includes:
    recovering, at the second server, a previously stored biometric signature of the user (C) and a vector of weights (W) thereof;
    selecting, by the second server, a set of coefficients ($C_0, C_1, C_2, \ldots, C_N$) of said stored biometric signature (C) to be used as cryptographic key, hashing the selected set of coefficients ($C_0, C_1, C_2, \ldots, C_N$) to produce a valid key (K), and generating a helper string (P);
    ciphering, by the second server, the OTP with the produced valid key (K) and sending the ciphered OTP together with at least the generated helper string (P) to the dedicated program;
    capturing, by the dedicated program, a biometric signature of the user (C'), said captured biometric signature (C') being captured by employing the same biometric technique as said stored biometric signature (C); and
    using, at the dedicated program, the received helper string (P) to determine the set of coefficients ($C_0, C_1, C_2, \ldots, C_N$) to be used at least for said captured biometric signature of the user (C') and hashing the set of coefficients ($C_0, C_1, C_2, \ldots, C_N$) to produce the valid key for deciphering the received OTP.

* * * * *